United States Patent [19]

Buschhoff et al.

[11] 3,894,066

[45] July 8, 1975

[54] METHOD FOR MAKING HIGHER ALKYL TIN THICHLORIDES

[75] Inventors: Max Buschhoff, Luenen; Karl Heinz Mueller, Werne, both of Germany

[73] Assignee: Schering Aktiengesellschaft, Berlin and Bergkamen, Germany

[22] Filed: Jan. 25, 1974

[21] Appl. No.: 436,795

[30] Foreign Application Priority Data
Jan. 31, 1973 Germany............................ 2304617

[52] U.S. Cl........................... 260/429.7; 260/448 A
[51] Int. Cl. ................................................ C07f 7/22
[58] Field of Search................................. 260/429.7

[56] References Cited
UNITED STATES PATENTS 3,287,386 11/1966 Neumann.......................... 260/429.7
3,454,569 8/1969 Gloskey........................... 260/429.7

FOREIGN PATENTS OR APPLICATIONS
1,070,179 12/1959 Germany

OTHER PUBLICATIONS

Neumann, Annalen, Vol. 653 (1963) p. 157–163.

Grosse et al., J. Org. Chem., 5 (1950) p. 107–121.

Sawyer, Organotin Compounds Vol. 1, 1971, Marcel Dekker Inc. N.Y. N.Y.

*Primary Examiner*—Arthur P. Demers
*Attorney, Agent, or Firm*—Curtis, Morris & Safford

[57] ABSTRACT

A method for making higher alkyl tin trichlorides of the formula $RSnCl_3$ by reacting a higher alkyl aluminum compound of the formula $R_xAlCl_{3-x}$, wherein $x$ is 1, 2, or 3, with an aluminum alcoholate of the formula $Al(OR')_3$ to form intermediate compounds of the formula $RAl(OR')Cl$, $R_2Al(OR')$, and $RAl(OR')_2$; reacting these intermediates with tin tetrachloride to form the desired alkyl tin trichloride. To isolate the alkyl tin trichloride from the reaction mixture, the dealkylated aluminium moiety has to be converted to a water-soluble species at a pH outside the range of 3,5 to 13.

2 Claims, No Drawings

METHOD FOR MAKING HIGHER ALKYL TIN THICHLORIDES

The present invention relates to a method for the preparation of higher alkyl tin trichlorides.

Alkyl tin trichlorides are important precursors in the preparation of polyvinyl chloride stabilizers. The bonding of alkyl groups to the tin atom can be accomplished in different ways [cf. W. P. Neumann, "Die organische Chemie des Zinns", pages 16–35, Ferdinand-Enke-Verlag, Stuttgart (1967)]. However, in most cases a mixture of higher alkylated tin chlorides is obtained. This is particularly true of the preparation of alkyl tin chlorides from tin tetrachloride and alkyl aluminum compounds, which produces a mixture of trialkyl tin chloride and tetraalkyl tin. The lower alkylation stages are then accessible by so-called comproportionation (loc. cit. pages 41 – 43). For example, alkyl tin trichlorides are obtained by comproportionation of tin tetraalkyls with tin tetrachloride:

$$R_4Sn + 3SnCl_4 \rightarrow 4RSnCl_3$$

The preparation of alkyl tin trihalides according to this process is, however, limited to a few alkyl groups (e.g. vinyl), or occurs only in a special solvent ($POCl_3/P_2O_5$). The reason for this difficulty is to be seen in that the step necessary for complete comproportionation, $$R_2SnCl_2 + SnCl_4 \rightarrow 2RSnCl_3 ,$$

can only be realized in the aforementioned exceptional cases.

However, methods have been developed according to which alkyl tin trichlorides are formed in combination with dialkyl tin chlorides and/or trialkyl tin chlorides (cf. German Pat. No. 1,161,893 or British Pat. No. 739,883). Alkyl tin trichlorides can be obtained from such mixtures by distillation, for example. However, this method is strongly limited because of the high boiling points of the longerchained alkyl tin trichlorides and is of practical significance only for the preparation of lower alkyl tin trichlorides.

The simplest possibility for preparing higher alkyl tin trichlorides would be the bonding of only one such alkyl radical to $SnCl_4$. However, until now, this could not be accomplished using the easily technically accessible higher aluminum trialkyls or the higher alkyl aluminum chlorides.

According to the present invention, a process for the preparation of higher alkyl tin trichlorides of the general formula $$RSnCl_3$$

has been found in which, first, higher alkyl aluminum compounds of the general formula $$R_xAlCl_{3-x}$$

in which $x = 1, 2,$ or 3, or mixtures of these compounds, are reacted with calculated amounts of aluminum alcoholates of the general formula $$Al(OR')_3$$

to form compounds of the following general formulas $$RAl(OR')Cl$$
$$R_2AlOR'$$
$$RAl(OR')_2$$

or mixtures of these compounds. In a second step, the compounds of the last-mentioned formulas are reacted with a calculated (i.e. stoichiometric) amount of tin tetrachloride to form the desired organotin compounds of the formula $RSnCl_3$. To isolate the alkyl tin trichloride from the reaction mixture, the dealkylated aluminum moiety has to be converted to a water-soluble species at a pH outside the range of 3,5 to 13. In these formulas R and R' are straight chain or branched, saturated or unsaturated, aliphatic or cycloaliphatic hydrocarbons having 3–18 carbon atoms. R' preferably has 3–10 carbon atoms and, in particular, represents isopropyl, sec.-butyl, or tert.-butyl.

The higher alkyl aluminum alcoholates have heretofore not been prepared from higher alkyl aluminum compounds and aluminum alcoholates by comproportionation. Rather, only the methyl- and ethyl compounds have until now been prepared in this manner [cf. A. V. Grosse et al., J. Org. Chem. 5, 118–119 (1940)]. Rather the same is true also of the alkyl alkoxy aluminum chlorides (cf. German Pat. No. 1,070,179). Because of the known low reactivity of higher alkyl aluminum compounds in comparison with the lower homologs, a property which can be observed in complex formation reactions for example, it was not to be foreseen that higher alkyl aluminum compounds could be reacted with aluminum alcoholates in a simple manner to form the higher alkyl aluminum alcoholates or the higher alkyl alkoxy aluminum chlorides.

The preparation of higher alkyl tin trichlorides by the reaction of $SnCl_4$ with the reaction product formed between higher alkyl aluminum compounds of the general formula $$R_xAlCl_{3-x} ,$$

where $x = 1, 2,$ or 3 and aluminum alcoholates of the general formula $Al(OR')_3$ takes place surprisingly well. Heretofore, only diethyl aluminum ethylate has been reacted with tin tetrachloride in ether [cf. W. P. Neumann, Liebigs Ann. Chem. 653, 163 (1962)]. Separation of the reaction products followed by distillation. However, such a preparative method cannot practically be employed for alkyl tin trichlorides higher than ethyl tin trichloride because of the thermal instability of the resulting $Cl_2AlOC_2H_5$-ether-complex.

Since the higher alkyl aluminum compounds are weaker alkylating agents than their lower homologs, it would be expected that higher dialkyl aluminum alcoholates are still weaker alkylating agents than diethyl aluminum ethylate. Thus, it is surprising that higher alkyl aluminum alcoholates or higher alkyl alkoxy aluminum chlorides can be employed for the monoalkylation of $SnCl_4$.

For the preparation of compounds according to the method of the invention, the higher alkyl aluminum compounds are reacted with aluminum alcoholates in a mol ratio from 4:1 to 1:2. The reaction temperature can be between room temperature and the decomposition temperature of the reaction mixture, but preferably is between about 40° and about 120°C. To carry out the reaction, the alkyl aluminum compound is kept under a protective inert atmosphere and the aluminum alcoholate is added thereto with stirring, for example.

The reaction is weakly exothermic. The pure reaction products are in most cases clear colorless liquids. As the number of carbon atoms in the alkyl groups increases, the products become viscous and, finally, solid.

Yields are practically quantitative. Technical grade starting materials can also be employed. In this case, the reaction products are usually lightly colored and often contain small amounts of suspended matter. These reaction products nevertheless can be further processed without disadvantage. No purification is necessary. The reaction can also take place in the presence of an inert organic solvent. The higher alkyl aluminum alcoholates and alkyl alkoxy aluminum chlorides are, with few exceptions, sensitive to atmospheric oxygen and water.

For reacting the higher alkyl aluminum alcoholates or the higher alkyl alkoxy aluminum chlorides with tin tetrachloride according to the process of the present invention, the tin tetrachloride is conveniently placed in a suitable reaction vessel and the calculated (i.e. stoichiometric) amount of the alkyl aluminum compound is added under a protective atmosphere.

The reaction temperature in this step can be between room temperature and the decomposition temperature of the reaction mixture, however it is preferably below about 80°C. For completion of the reaction, an ether, preferably di-n-butyl ether, is advantageously then added also at a temperature below 80°C. After the reaction is completed, the aluminum compounds formed are conveniently hydrolyzed by pouring the reaction mixture into an aqueous solution of a strong acid, e.g. of a mineral acid such as HCl. After separation of the phases and distillative removal of the ether, the higher alkyl tin trichloride remains as a liquid or as a solid of low melting point, in a high degree of purity. The amount of higher alkylated tin compounds in general is below 5 percent.

A better understanding of the present invention and of its many advantages can be had by referring to the following specific examples, given by way of illustration.

EXAMPLE 1

890 g (2.4 mols) of trioctyl aluminum are introduced into a suitable reaction vessel under a protective nitrogen atmosphere and are warmed to 85°C. 240 g (1.2 mols) of aluminum isopropylate are then added with stirring at a temperature of 85°–95°C. When addition is completed, the reaction mixture is stirred for an additional hour at 85°C. After cooling, 1130 g of dioctyl aluminum isopropylate are obtained. This is a liquid hving a density of 0.85g/cm$^3$ at 20°C. and a viscosity of about 28 centistokes.

EXAMPLES 2–13

Alkyl aluminum compounds are reacted with aluminum alcoholates as in Example 1. The details of the Examples are summarized in following Table I.

TABLE I

| Example | $R_xAlCl_{3-x}$ R | x | R' in Al(OR')$_3$ | Mol Ratio $R_xAlCl_{3-x}$: Al(OR')$_3$ | Temperature (°C) | $R_yAl(OR')_yCl_z$ |
|---|---|---|---|---|---|---|
| 2 | $C_4H_9$ | 3 | $iC_3H_7$ | 2:1 | 50 – 80 | $(C_4H_9)_2Al-O-iC_3H_7$ |
| 3 | $iC_4H_9$ | 3 | $iC_4H_9$ | 2:1 | 20 – 60 | $(iC_4H_9)_2Al-O-iC_4H_9$ |
| 4 | $C_8H_{17}$ | 3 | sec.$C_4H_9$ | 2:1 | 20 – 50 | $(C_8H_{17})_2Al-O-sec.C_4H_9$ |
| 5 | $C_8H_{17}$ | 3 | tert.$C_4H_9$ | 2:1 | 100 – 120 | $(C_8H_{17})_2Al-O-tert.C_4H_9$ |
| 6 | $C_8H_{17}$ | 3 | $C_8H_{17}$ | 2:1 | 100 – 120 | $(C_8H_{17})_2Al-O-C_8H_{17}$ |
| 7 | $C_8H_{17}$ | 3 | $iC_8H_{17}$ | 2:1 | 100 – 120 | $(C_8H_{17})_2Al-O-iC_8H_{17}$ |
| 8 | $C_{14}H_{29}$ | 3 | $iC_3H_7$ | 2:1 | 35 – 115 | $(C_{14}H_{29})_2Al-O-iC_3H_7^+$ |
| 9 | $C_{18}H_{37}$ | 3 | $iC_3H_7$ | 2:1 | 105 – 120 | $(C_{18}H_{37})_2Al-O-iC_3H_7^+$ |
| 10 | $C_8H_{17}$ | 3 | sec.$C_4H_9$ | 1:2 | 20 – 120 | $C_8H_{17}Al(O-sec.C_4H_9)_2$ |
| 11 | $C_8H_{17}$ | 1.5$^a$ | $iC_3H_7$ | 1:1 | 60 – 70 | $C_8H_{17}Al(OiC_3H_7)Cl$ |
| 12 | $C_8H_{13}$ | 3* | $iC_3H_7$ | 2:1 | 70 – 85 | $(C_8H_{13})_2Al-O-iC_3H_7$* |
| 13 | $C_{10}H_{19}$ | 3$^b$ | $iC_3H_7$ | 2:1 | 100 – 1200 | $(C_{10}H_{19})_2Al-O-iC_3H_7^b$ |

*$C_8H_{13}=$ 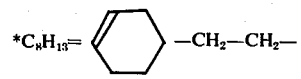 $-CH_2-CH_2-$

+Solid at room temperature
$^a$Octyl aluminum sesquichloride
$^b C_{10}H_{19}=CH_3-C(CH_3)=CH-(CH_2)_2-CH(CH_3)-(CH_2)_2-$

EXAMPLE 14

520 g (2 mols) of SnCl$_4$ are introduced into a one-liter three-necked flask equipped with a stirrer, Claisen attachment, thermometer, reflux condenser, and dropping funnel. 329 g (1.05 mols) of dioctyl aluminum isopropylate are added thereto dropwise with stirring and cooling at 40°C. over a period of 30 minutes. Stirring is continued for 15 minutes at 40°C. and 260 g (2 mols) of di-n-butylether are added dropwise also with stirring and cooling at a temperature of 40°–50°C. About 15 minutes after addition has been completed, the reaction mixture is poured into 350 ml of an ice-cold 3 percent aqueous solution of hydrogen chloride. The organic phase is separated and, after distillative removal of the di-n-butylether under reduced pressure, 680 g of crude product having a tin content of 33.9 percent (calculated = 35.09 percent) are obtained. This corresponds with a yield of 97 percent calculated on the added tin in the form of SnCl$_4$.

EXAMPLEs 15 - 24

SnCl$_4$ is reacted with alkyl aluminum alcoholates or alkyl alkoxy aluminum chlorides as in Example 14. The results are summarized in following Table II.

TABLE II

| Example | $R_xAl(OR')_yCl_z$ | Mol Ratio Sn:Al | Temperature (°C) | $RSnCl_3$ | Yield (%) |
|---|---|---|---|---|---|
| 15 | $(iC_4H_9)_2Al-O-iC_3H_7$ | 2:1 | 40 | $iC_4H_9SnCl_3$ | 80 |
| 16 | $(C_4H_9)_2Al-O-iC_3H_7$ | 2:1 | 40 | $C_4H_9SnCl_3$ | 86 |
| 17 | $(C_8H_{17})_2Al-O-iC_3H_7$ | 2:1 | 70 | $C_8H_{17}SnCl_3$ | 90 |
| 18 | $C_8H_{17}Al(O-iC_3H_7)Cl$ | 1:1 | 25 | $C_8H_{17}SnCl_3$ | 80 |
| 19 | $(C_8H_{17})_2Al-O-sec.C_4H_9$ | 2:1 | 40 | $C_8H_{17}SnCl_3$ | 95 |
| 20 | $(C_8H_{17})_2Al-O-tert.C_4H_9$ | 2:1 | 40 | $C_8H_{17}SnCl_3$ | 95 |
| 21 | $(C_{14}H_{29})_2Al-O-iC_3H_7$ | 2:1 | 60 | $C_{14}H_{29}SnCl_3$ | 80 |
| 22 | $(C_{18}H_{37})_2Al-O-iC_3H_7$ | 2:1 | 60 | $C_{18}H_{37}SnCl_3$+ | 72 |
| 23 | $(C_8H_{13})_2Al-O-iC_3H_7$* | 2:1 | 40 | $C_8H_{13}SnCl_3$* | 90 |
| 24 | $(C_{10}H_{19})_2Al-O-iC_3H_7$" | 2:1 | 40 | $C_{10}H_{19}SnCl_3$" | 80 |

*$C_8H_{13}$= 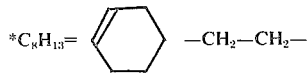

+Solid at room temperature
"$C_{10}H_{19}$=$CH_3-C(CH_3)=CH-(CH_2)_2-CH(CH_3)-(CH_2)_2-$

What is claimed is:
1. The method of making octyltin trichloride of the formula $C_8H_{17}SnCl_3$ which comprises
   a. reacting an octyl aluminum compound of the formula

$(C_8H_{17})_xAlCl_{3-x}$, wherein $x$ is 1, 2, or 3, or mixtures thereof, with a calculated amount of an aluminum alcoholate of the formula $Al(OR')_3$, wherein R' is a straight-chain or branched-chain saturated or unsaturated aliphatic or cycloaliphatic hydrocarbon having 3 to 18 carbon atoms, to form at least one intermediate compound of a formula selected from the group consisting of $C_8H_{17}Al(OR')Cl$ $(C_8H_{17})_2Al(OR')$ and $C_8H_{17}Al(OR')_2$;

b. reacting said intermediate with a stoichiometric amount of tin tetrachloride to form the desired octyltin trichloride; and
   c. isolating said octyltin trichloride from the reaction mixture by converting the dealkylated aluminum moiety to a water-soluble species at a pH outside the range of 3.5 to 13.
2. A method as in claim 1 wherein R' is isopropyl, sec.-butyl, or tert.-butyl.

* * * * *